United States Patent [19]
Crabbe et al.

[11] 3,886,206
[45] May 27, 1975

[54] 10,11-METHYLENE-SUBSTITUTED PHOSTAGLANDIN DERIVATIVES

[75] Inventors: Pierre Crabbe; Pierre Vogel, both of Mexico City, Mexico

[73] Assignee: Syntex (U.S.A.) Inc., Palo Alto, Calif.

[22] Filed: Sept. 8, 1972

[21] Appl. No.: 287,242

[52] U.S. Cl...... 260/514 D; 260/240 R; 260/468 R; 260/468 D; 260/468 G; 260/448 R; 260/469; 260/473 G; 260/476 C; 260/476 R; 260/483; 260/484 R; 260/484 A; 260/486 R; 260/488 R; 260/501.11; 260/501.17; 424/305; 424/317
[51] Int. Cl...................... C07c 64/74; C07c 61/36
[58] Field of Search..................... 260/468 D, 514 D

[56] References Cited
UNITED STATES PATENTS
3,755,426   8/1973   Strike et al. ........................ 260/514

OTHER PUBLICATIONS
Ramwell et al., Nature 221, 1258, (1969).

*Primary Examiner*—Robert Gerstl
*Attorney, Agent, or Firm*—Gerard A. Blaufarb; William B. Walker; Lawrence S. Squires

[57] ABSTRACT

Novel prostaglandin derivatives of the $PGA_1$ and $PGA_2$ series having a methylene group at C-10,11 or a methyl group at C-11 and unsaturation at C-10 and process for the production thereof, 9-keto-10$\beta$,11$\beta$-methylene-15$\alpha$-hydroxyprosta-5,13-dienoic acid and 9-keto-11-methyl-15$\alpha$-hydroxyprosta-5,10,13-trienoic acid are representative of the class. Also included are the pharmaceutically acceptable, non-toxic esters and salts of the carboxylic acid function and/or the pharmaceutically acceptable, non-toxic esters and/or ethers of the 15$\alpha$-hydroxy group. These compounds possess prostaglandin-like activity and thus are useful in the treatment of mammals, where prostaglandins are indicated.

5 Claims, No Drawings

10,11-METHYLENE-SUBSTITUTED PHOSTAGLANDIN DERIVATIVES

The present invention relates to certain novel prostaglandin derivatives and to a process for the production thereof.

More particularly, the present invention relates to a process for preparing the novel 10,11-methylene (cyclopropyl) and 11-methyl substituted prostaglandins of the PGA$_1$ and PGA$_2$ series as well as the pharmaceutically acceptable, non-toxic esters, ethers and salts thereof.

Prostaglandins are members of a new class of hormonal agents with a remarkable range of biological and pharmaceutical properties. These compounds belong to a group of chemically related 20-carbon chain hydroxy fatty acids having the basic skeleton of prostanoic acid:

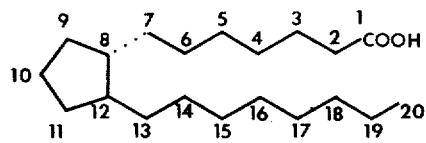

Prostanoic Acid

The prostaglandins having a double bond between the C-10 and C-11 positions and a keto group at C-9 position are known as the PGA series.

The prostaglandins having a hydroxy group at the C-11 position and a keto group at the C-9 position are known as the PGE series, those having a hydroxyl group in place of the keto group are known as the PGF series and are further designated by an α or β suffix to indicate the configuration of the hydroxyl group at said position. The natural compounds are the α-hydroxy substituted compounds. They may contain different degrees of unsaturation in the molecule, particularly at C-5, C-13 and C-17, the unsaturation is also indicated by a suffix. Thus, for example, PGA$_1$ refers to a PGA series of prostaglandins having a trans-olefin bond at the C-13(14) position and the term PGA$_2$ refers to a PGA series of prostaglandins having a trans-olefin bond at the C-13(14) position and also having a cis-olefin bond at the C-5(6) position. For a review on prostaglandins and the definition of primary prostaglandins, see for example S. Bergstrom, *Recent Progress in Hormone Research*, 22, pages 153–175 (1966) and Science, 157, page 382 (1967) by the same author.

Prostaglandins are widely distributed in mammalian tissues and have been isolated from natural sources in very small amounts. In addition, a number of the natural occurring prostaglandins have been prepared by chemical synthesis; note, for example, *J. Am. Chem. Soc.*, 91, p. 5675 (1969); *J. Am. Chem. Soc.*, 92, p. 2586 (1970) and *J. Am. Chem. Soc.*, 93, pages 1489–1493 (1971) and references cited therein, W. P. Schneider et al, *J. Am. Chem. Soc.*, 90, p. 5895 (1968); U. Axen et al., *Chem. Commun.*, page 303 (1969) and W. P. Schneider, *Chem. Commun.*, page 304 (1969).

It has also been reported by A. J. Weinheimer et al. (*Tetrahedron Letters*, 5183 (1969)) that a type of coral, the sea whip or sea fan Plexaura homomalla found in reefs off the Florida coast, in the Caribbean region, contains high concentrations of prostaglandin derivatives of the PGA$_2$ series, to which they assigned the unnatural (R) configuration for the hydroxyl group at C-15. More recently, W. P. Schneider et al., (*J. Am. Chem. Soc.*, 94, 2122 (1972)) reported that some forms of P. homomalla contain, instead of the (15R) prostaglandins, esterified derivatives of (15S)-PGA$_2$ and (15S)-PGA$_2$, identical with the prostaglandins derived from mammalian sources. They also found that some specimens of this gorgonian may contain both (15R) and (15S) prostaglandins.

Because of the remarkable range of biological and pharmacological properties exhibited by this family of compounds, a great deal of interest has focused upon such compounds, and accordingly we have synthesized a new group of prostaglandin derivatives which exhibit general prostaglandin pharmacological and biological properties.

In accordance with the present invention, we have prepared certain novel modified prostaglandins of the PGA$_2$ series using as starting material the methyl ester (15S) acetate of PGA$_2$ isolated from the marine invertebrate Plexaura homomalla which, if desired, can be selectively reduced to the corresponding PGA$_1$ derivatives of the invention.

The novel prostaglandin derivatives of the present invention can be represented by the following formulas:

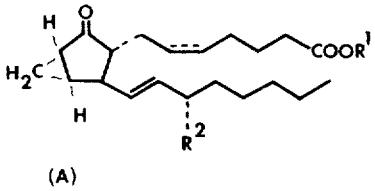 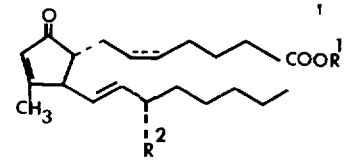

(A)          (B)

wherein R$^1$ is hydrogen or lower alkyl; R$^2$ is hydroxy or a conventional hydrolyzable ester or ether group; the dotted bond line between the C-5 and C-6 position indicates that the bond joining the C-5 and C-6 position is a saturated ethylene bond or a cis-olefin double bond; and the wavy lines indicate compounds having 10,11-methylene group and the hydrogen atoms attached thereto at the α- or β-configuration with respect to the cyclopentanone moiety and mixtures thereof.

Also encompassed within the compounds of the invention are pharmaceutically acceptable salts of the above compounds of formulas A and B wherein R$^1$ is hydrogen.

The double bonds in the compounds of the present invention have the same configuration as in natural prostaglandins isolated from mammalian sources, i.e. the double bond at C-5,6 is in cis configuration and the double bond at C-13,14 is in trans configuration.

The preferred compounds are those wherein R$^1$ is hydrogen and/or wherein the 10,11-methylene group has the β-configuration with respect to the cyclopentanone moiety.

As used herein above and below the following terms have the following meanings unless expressly stated to the contrary. The term "lower alkyl" defines aliphatic hydrocarbon radicals of from one to four carbon atoms inclusive, including all isomers thereof. Typical lower alkyl groups are methyl, ethyl, n-propyl, isopropyl, n-butyl and t-butyl.

The term "conventionally hydrolyzable esters or ethers," as used herein, refers to those physiologically acceptable hydrolyzable ester and ether groups employed in the pharmaceutical art and preferably contain from one through 12 carbon atoms. The conventionally hydrolyzable esters are derived from hydrocarbon carboxylic acids. The term "hydrocarbon carboxylic acid" defines both substituted and unsubstituted carboxylic acids. These acids can be completed saturated or possess varying degrees of unsaturation (including aromatic), can be of straight chain, branched chain or cyclic structure, and preferably contain from one to 12 carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitro-benzoate, aminoacetate, diethylaminoacetate, piperidinoacetate, $\beta$-chloropropionate, trichloroacetate, $\beta$-chlorobutyrate, bicyclo[2.2.2]-octane-1-carboxylate, 4-methylbutylo[2.2.2]-oct-2-ene-1-carboxylate, and the like. The preferred conventional hydrolyzable ester is acetate.

"Conventional hydrolyzable ethers" include the methyl, ethyl, cyclopentyl, tetrahydrofuran-2-yl, tetrahydropyran-2-yl, and 4-methoxytetrahydropyran-4-yl ethers.

The addition salts are derived from pharmaceutically acceptable non-toxic basic salts, which do not significantly adversely affect the properties of the parent compounds, including, for example, metal salts such as sodium, potassium, calcium, magnesium, aluminum and the like, as well as organic amine salts such as ammonium, triethylamine, 2-dimethylamino ethanol, 2-diethylamino ethanol, lysine, arginine, caffeine, procaine, N-ethylpiperidine, and the like.

The process for producing the compounds of the present invention can be schematically illustrated by the following sequence of overall reaction equations:

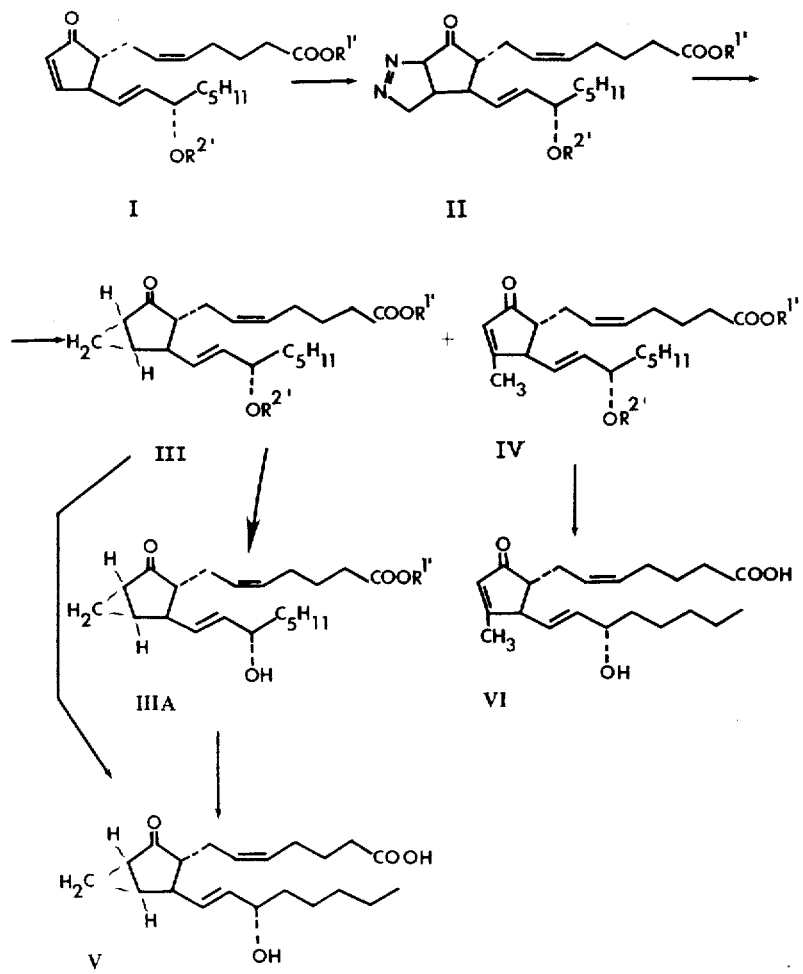

wherein $R^{1'}$ is lower alkyl; and $OR^{2'}$ is a conventional acyloxy group.

In practicing the process outlined above, the starting material, (15S) PGA$_2$ methyl ester acetate (9-keto-15$\alpha$-acetoxyprosta-5-cis,10,13-trans-trienoic acid methyl ester), compound of formula I is treated with an excess of an ethereal solution of diazomethane, to yield the pyrazoline of formula II. This reaction is conducted at room temperature or below, for a period of time of about 10 to 30 hours, preferably for about 14 to 20 hours. The product is isolated from the reaction mixture by conventional techniques, and preferably by evaporation of the solvent and excess reagent under reduced pressure followed by thin-layer chromatography in the absence of light. This pyrazoline is very unstable and therefore it is recommended to use it for the next step immediately after purification.

The pyrazoline (formula II) is irradiated with ultraviolet light in an inert organic solvent such as diethyl ether, tetrahydrofuran, acetonitrile or mixtures thereof, to effect photochemical addition and cyclo addition, obtaining a mixture of the compounds of formulas III and IV. In the preferred embodiment, this reaction is conducted using absolute diethyl ether as the inert organic solvent, and ultraviolet light of a wave length of about 270 to 400 m$\mu$, under an inert atmosphere, e.g., under argon or nitrogen atmosphere. This photochemical reaction is performed in a Pyrex vessel at low temperatures, preferably at temperatures of about from −20° to −70°C, for a period of time of about from 15 minutes to 12 hours, a period of 2 to 5 hours being generally sufficient. The course of the reaction can be followed by determination of the uv spectrum, interrupting the irradiation when the intensity of the absorption at 325 m$\mu$ is reduced to about one-tenth to one-twentieth its original intensity.

Any suitable source of ultraviolet irradiation of a wave length of about 270 to 400 m$\mu$ can be employed for this photochemical reaction. Suitable light sources include, for example, commercially available high pressure mercury vapor lamps.

When the reaction is complete, the solvent can be eliminated under reduced pressure and the oily residue immediately purified by thin-layer chromatography (t.l.c.) to afford a mixture of the 10,11-methylene (cyclopropyl) compound (III) and the 11-methyl-10-dehydroprostaglandin derivative (IV) which is then separated by chromatography on a silica plate.

Typically the compounds of formula IV are obtained in slightly higher yields than the compounds of formula III and typically with respect to the 10$\alpha$,11$\alpha$-methylene- and 10$\beta$,11$\beta$-methylene isomers of formula III — the predominant product is the 10$\beta$,11$\beta$-methylene derivative with only small quantities of the 10$\alpha$,11$\alpha$-methylene derivatives of formula III being obtained. It has further been discovered that by using more solvent, i.e., by using more dilute concentrations of the compound of formula II, in the photochemical reactions that the yields of the compound of formula III can be increased.

The methyl ester group and the 15-acetoxy group of compounds of formulas III and IV can be saponified by chemical or enzymatic methods, to yield the corresponding hydroxy acids of formulas V and VI, respectively.

In the preferred embodiments, the compound of formula III is hydrolyzed by a two step mild alkaline hydrolysis. The first step is conducted under anhydrous conditions, using an anhydrous alkali metal carbonate such as sodium carbonate or potassium carbonate in a dry lower aliphatic alcohol, particularly methanol, effecting the reaction at about room temperature or below for a period of time of between 15 minutes to 2 hours, preferably for about 90 minutes, at about 22°C, the reaction time depending upon the temperature at which the hydrolysis takes place. This results in the selective hydrolysis of the 15-acetoxy function, thus yielding 9-keto-10,11-methylene-15$\alpha$-hydroxyprosta-5-cis,13-trans-dienoic acid methyl ester, compound of formula IIIA. When other aliphatic alcohols are used such as ethanol or propanol, trans-esterification of the carboxylate function is simultaneously obtained. Upon reaction of the latter compound with an alkali metal carbonate such as those previously mentioned in an aqueous aliphatic alcohol, at a temperature above room temperature, of the order of about 30° to 50°C, preferably at about 40°C for a period of time of about 12 to 20 hours, preferably for about 16 hours, there is hydrolyzed the carboxylic acid ester, thus yielding, after acidification, 9-keto-10,11-methylene-15$\alpha$-hydroxyprosta-5-cis,13-trans-dienoic acid, compound of formula V. Both hydrolysis steps are preferably conducted under an inert atmosphere, i.e., under nitrogen or argon atmosphere.

Alternatively, the hydrolysis of both the acetoxy and the carboxylate functions can be effected in a single step following the second procedure, i.e., using aqueous conditions under slight heating; however, better yields and a product of a higher purity is obtained when the hydrolysis is effected by the two step sequence.

Compound IV is preferably hydrolyzed by using enzymes in aqueous solutions. For this enzymatic hydrolysis, there is preferably used a crude pancreatic lipase commercially available (Sigma Steapsin.) however, other enzyme systems which are known as useful for the hydrolysis of compounds unstable to alkaline or acid conditions can also be practical. Other lipases obtainable from bacterial sources, such as the partially purified lipase obtained from Corynebacterium acnes culture supernatant can also be used.

The hydrolysis of compound IV with the crude pancreatic lipase can be conducted in a buffered aqueous solution containing sodium chloride and calcium chloride, at a neutral or almost neutral pH, at a temperature of between 22° to 30°C, preferably at about 25° to 27°C for a period of time of between 18 to 30 hours adjusting the pH of the reaction mixture to 7.2 to 7.4 by addition of, for example, dilute sodium hydroxide solution, at intervals. Compound of formula IV is dissolved in the previously prepared buffered lipase aqueous solution by sonication at about 37°C for about 30 minutes using from about 0.5 ml. to about 1 ml. of the lipase solution per milligram of substrate. The methyl ester group is readily hydrolyzed within a short period of time. However, to achieve hydrolysis of the acetoxy group, longer reaction times are required, of the order of 18 to 24 hours. The course of the reaction can be followed by thin-layer chromatography, when the hydrolysis is complete, the free acid can be isolated from the reaction mixture by conventional techniques, such as acidification with a dilute acid solution, e.g., using dilute hydrochloric acid, extraction with a solvent immiscible with water such as diethyl ether, ethyl acetate, chloroform, methylene chloride, and the like, evaporation of the solvent and purification of the residue by column chromatography, thin-layer chromatography or liquid chromatography; good results in the separation of the acid VI from the lipase have been obtained by column chromatography on Florisil.

The enzymatic hydrolysis above described can also be applied to the compounds of formula IIIA as substrate, to produce the corresponding acids of formula V.

Alternatively, two distinct enzymes can be used, for the hydrolysis of the methyl ester and for the cleavage of the 15-acetate, respectively. Thus, there can be used a lipase of those that are known to act on water insoluble esters of long chain fatty acids for the hydrolysis of the methyl esters (L. Sarda et al., *Biochem. Biophys. Acta.* 23:264 (1957), or baker's yeast (C. J. Sih et al, *J. C. S. Chem. Comm.* 240 (1972), and a C-esterase, e.g. from orange peel or hog's kidney for hydrolyzing the 15-acetate (J. D. A. Jeffery et al, *Biochem. J.* 81, page 591 (1961) and F. Bergmann et al, *Biochem. J.* 77, page 209 (1960), respectively).

The $PGA_1$ series of compounds of formula A and B can be conveniently prepared by selectively reducing the C-5(6)-cis-olefin bond of the corresponding $PGA_2$ series of derivatives of the invention according to the same procedure as described by Koch et al in the *Journal of Labelled Compounds*, Vol. VI, No. 4, page 395 (October–December, 1970) with respect to the reduction of $PGE_2$ prostaglandins to $PGE_1$ prostaglandins.

The 15α-hydroxyl group in compounds of formulas A and B, of the invention, can be reesterified in a conventional manner, preferably using a carboxylic acid anhydride in pyridine solution.

Etherification of the hydroxyl group can also be carried out by conventional techniques. For example, reaction with dihydropyran, dihydrofuran or 4-methoxy-5,6-dihydro-2H-pyran in an inert solvent such as, for example, methylene chloride or benzene and in the presence of an acid catalyst (e.g., p-toluenesulfonic acid) produces the tetrahydropyran-2'-yloxy, tetrahydrofuran-2'-yloxy or 4'-methoxytetrahydropyran-4'-yloxy derivatives, respectively. Methyl, ethyl, and cyclopentyl ethers can, for example, be prepared by reaction of the hydroxylated compound with sodium hydride and methyl iodide, ethyl iodide, and cyclopentyl bromide, respectively.

Although the esterification or etherification reactions are usually effected using an excess of the esterifying or etherifying agents, it is preferable to use at least one molar equivalent of said reagents per hydroxyl group present in the starting compound.

The alkyl esters of the carboxylic acid function can be prepared by treatment of the free acid with an excess of a diazoalkane such as diazomethane, diazoethane or diazopropane in ether or methylene chloride solution, in a conventional manner or by reaction with the desired lower alkyl iodide in the presence of lithium carbonate, at room temperature.

The salt derivatives of the prostanoic acids of the present invention can be prepared by treating the corresponding free acids with about one molar equivalent of a pharmaceutically acceptable base per molar equivalent of free acid. Suitable pharmaceutically acceptable bases include, for example, sodium hydroxide, trimethylamine, triethylamine, tripropylamine, β-(dimethylamino)ethanol, β-(diethylamino)ethanol, arginine, lysine, caffeine, procaine and the like. Typically the reaction is conducted in an aqueous solution, alone or in combination with an inert, water miscible organic solvent, at a temperature of about from 0° to 30°C, preferably at room temperature. Typical inert, water miscible organic solvents include methanol, ethanol, isopropanol, butanol, dioxane or tetrahydrofuran. When divalent metal salts are prepared, such as the calcium salts or magnesium salts, the free acid starting material is treated with at least one half molar equivalent of the pharmaceutically acceptable base.

The compounds and salts of the invention exhibit prostaglandin-like biological activities and thus are useful in the treatment of mammals where the use of prostaglandins is indicated. These compounds are bronchodilators and thus are useful in treating mammals for bronchial spasm or wherever strong bronchodilators are indicated. The compounds and salts are also useful in controlling or palliating hypertension in mammals and further exhibit central nervous system depressant activity in mammals, and are useful as sedatives. In addition, the compounds are useful for inducing labor, in pregnancy, and for inducing menses to correct or reduce menstrual abnormalities.

The compounds and/or salts, of the invention, can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid, or aerosol, in which the compound and/or salt is dissolved, dispersed or suspended, and can optionally contain small amounts of preservatives and/or pH-buffering agents. Suitable preservatives which can be used include, for example, benzyl alcohol, and the like. Suitable buffering agents include, for example, sodium acetate, pharmaceutical phosphate salts and the like.

The liquid compositions can, for example, be in the form of solutions, emulsions, suspensions, syrups or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds and/or salts can, for example, be administered as an aerosol comprising the compounds or salts in an inert propellant together with a co-solvent (e.g., ethanol) together with optional preservatives and buffering agents. Additional general information concerning the inhalation administration of aerosols can be had by reference to U.S. Pat. Nos. 2,868,691 and 3,095,355.

The compounds of this invention are typically administered in dosages of about from 0.1 to 10 mg. per kg. of body weight. The precise effective dosage will, of course, vary depending upon the mode of administration, condition being treated, and host.

The following Examples illustrate, but are not intended to limit the scope of the invention. Also where required, Examples are repeated to provide sufficient starting materials for subsequent Examples.

EXAMPLE 1

Six hundred milligrams of 9-keto-15α-acetoxyprosta-5-cis, 10,13-trans-trienoic acid methyl ester (isolated from the gorgonian Plexaura homomalla and purified by successive chromatographies, first on a synthetic magnesium silicate, sold under the trademark Florisil, by the Floridin Company, column using methylene chloride-ether mixtures in which the ether concentration is gradually increased and thereafter by thin-layer chromatography on silica gel, using methylene chloride-ethyl acetate (95:5) as gradient), are dissolved in 50 ml. of a saturated solution of diazomethane in diethyl ether, and the solution is maintained at room temperature for 16 hours. The reaction mixture is evaporated to dryness under reduced pressure at about 0°C and the oily residue purified by thin-layer chromatography on silica gel, in the absence of light, using methylene chloride-ethyl acetate (9:1) as eluant to yield 9-keto-[10,11c]-pyrazolo-15α-acetoxyprosta-5-cis,13-trans-dienoic acid methyl ester as a pale yellow oil.

EXAMPLE 2

A solution of 290 mg. of the freshly purified 9-keto-[10,11c]-pyrazolo-15α-acetoxyprosta-5-cis,13-trans-dienoic acid methyl ester in 300 ml. of absolute diethyl ether is filtered through 1 g. of a synthetic magnesium silicate, sold under the trademark Florisil, by the Floridin Company, to eliminate highly colored polymer which forms at room temperature, into the Pyrex vessel of an irradiation apparatus, cooled to −50° to −70°C, under argon atmosphere. The stream of argon is passed through the solution for 30 minutes further and then the cooled solution is irradiated using mercury vapor lamp, sold under the trademark Hanu Q 81, for four to five hours, until the intensity of the absorption at 327 nm is reduced to 0.1 of its original intensity. The ether is evaporated under vacuum at 0°C, and the oily residue purified immediately by thin-layer chromatography, using methylene chloride-ethyl acetate (9:1) as eluant, to produce two main fractions having different Rf values, as well as a small amount of recovered starting material. These two fractions are purified individually by chromatography on silica gel, using hexane-ethyl acetate (75:25) as eluant, the fraction having a Rf 0.37 is pure 9-keto-11-methyl-15α-acetoxyprosta-5-cis,10,13-trans-trienoic acid methyl ester, a pale yellow oil.

The fraction having an Rf value of 0.54 contains a colorless oil mainly 9-keto-10β,11β-methylene-15β-acetoxyprosta-5(c),13(t)-dienoic acid methyl ester and traces of the 10α,11α-methylene isomer.

EXAMPLE 3

To a solution of 120 mg. of 9-keto-10β,11β-methylene-15α-acetoxyprosta-5-cis-13-trans-dienoic acid methyl ester in 10 ml. of anhydrous methanol is added 100 mg. of dried potassium carbonate. The reaction mixture is stirred at room temperature for 90 minutes, under nitrogen atmosphere. A solution of 3 g. of ammonium chloride in 10 ml. of water is then added and the methanol eliminated under reduced pressure. The aqueous mixture is then extracted with three 20 ml. portions of ethyl acetate, the combined organic extract is dried over sodium sulfate and evaporated to dryness under reduced pressure. The residue is purified by thin-layer chromatography using methylene chloride-ethyl acetate (9:1) as eluant (three runs). Three products are detected in the chromatoplates. The less and the most polar products are fluorescent under uv light, the third product (invisible under uv light) which separates partially from the most polar product corresponds to 9-keto-60β,11β-methylene-15α-hydroxyprosta-5-cis-13-trans-dienoic acid methyl ester.

EXAMPLE 4

Ten milligrams of 9-keto-10β,11β-methylene-15α-hydroxyprosta-5-cis-13-trans-dienoic acid methyl ester are dissolved in a mixture of 1 ml. of methanol, 1 ml. of water of 45 mg. of potassium carbonate. The reaction mixture is maintained at 40°C for 16 hours under nitrogen atmosphere, 10 ml. of water are then added, and the reaction mixture is then evaporated under reduced pressure to half volume. It is then acidified to pH 2 with 2N hydrochloric acid and extracted several times with ethyl acetate. The combined organic extracts are dried over sodium sulfate and evaporated to dryness under reduced pressure to yield 9-keto-10β,11β-methylene-15α-hydroxyprosta-5-cis,13-trans-dienoic acid, 95% pure, which can be further purified by chromatography on a synthetic magnesium silicate, sold under the trademark Florisil, by the Floridin Company.

EXAMPLE 5

A. A suspension of 4 g. of crude pancreatic lipase (Sigma L-3126) in 40 ml. of an 0.1 M sodium chloride and 0.05 M calcium chloride solution in water is stirred at 25°C for one hour. The mixture is then centrifuged for 1 hour at 5000 rev./min. and at 25° to 30°C. The supernatant is neutralized with 1N sodium hydroxide solution to pH 7.2 to 7.4 and used directly for the hydrolysis of the prostaglandin derivatives of the invention.

B. Forty-two milligrams of 9-keto-11-methyl-15α-acetoxyprosta-5-cis,10,13-trans-trienoic acid methyl ester are dissolved by sonication at 37°C for 20 minutes in 30 ml. of the lipase solution prepared as described in part A. The reaction mixture is magnetically stirred for 24 hours at 25° to 26°C, adjusting constantly the pH at 7.2 to 7.4 during the reaction period with 1N sodium hydroxide solution. The reaction mixture is then acidified to pH 2.5 using an 0.2N hydrochloric acid solution and the product extracted several times from the solution with ethyl acetate and ether. The combined organic extracts are dried over sodium sulfate and evaporated to dryness under vacuo. The residue is dissolved in methylene-chloride and chromatographed on 3 g. of a magnesium silicate, sold under the trademark Florisil, by the Floridin Company. The column is eluted successively with methylene chloride diethyl ether mixtures, diethyl ether, diethyl etherethyl acetate mixtures, pure ethyl acetate and ethyl acetate containing 1% of acetic acid. The fractions eluted with the latter solvent mixture afford the pure 9-keto-11-methyl-15α-hydroxyprosta-5-cis,10,13-trans-trienoic acid (11-methyl PGA₂) as a colorless, amorphous product.

Similarly, by following the same procedure, 9-keto-10β,11β-methylene-15α-acetoxyprosta-5-cis,13-trans-dienoic acid methyl ester is converted into 9-keto-10β,11β-methylene-15α-hydroxyprosta-5-cis,13-trans-dienoic acid.

EXAMPLE 6

To a solution of 200 mg. of 9-keto-10β,11β-methylene-15α-hydroxyprosta-5-cis,13-trans-dienoic acid methyl ester in 5 ml. of methylene chloride are added 5 mg. of p-toluenesulfonic acid, and 0.2 ml. of freshly distilled dihydropyran. The reaction mixture is stirred for 15 minutes at room temperature, a few drops of pyridine are added and diluted with ether. The ethereal solution is washed with saturated sodium chloride solution. The organic phase is separated, dried over magnesium sulfate and evaporated to dryness under reduced pressure, at approximately 0°C. The oily residue is purified by thin-layer chromatography using chloroform-methanol (9:1) as eluant to produce 9-keto-10β,11β-methylene-15α-tetrahydropyran-2'-yloxyprosta-5-cis,13-trans-dienoic acid methyl ester.

Upon hydrolysis of the methyl ester group in accordance with the method of Example 4 there is obtained 9-keto-10β,11β-methylene-15α-tetrahydropyran-2'-yloxyprosta-5-cis,13-trans-dienoic acid.

In a similar manner but using dihydrofuran and 4-methoxy-dihydropyran instead of dihydropyran in the above procedure, there are respectively obtained 9-keto-10β,11β-methylene-15α-tetrahydrofuran-2'-yloxyprosta-5-cis,13-trans-dienoic acid and 9-keto-10β,11β-methylene-15α-(4'-methoxytetrahydropyran-4'-yloxy)-prosta-5-cis,13-trans-dienoic acid, via the corresponding methyl esters.

EXAMPLE 7

Fifteen milligrams of 9-keto-10β,11β-methylene-15α-hydroxyprosta-5-cis,13-trans-dienoic acid is dissolved in a mixture of 2 ml. of benzene and 3 ml. of acetone containing 5 mg. of freshly prepared tris-(triphenylphosphine)chlororhodium, at room temperature. The resulting mixture is stirred in a hydrogen atmosphere and aliquots are removed at periodic intervals. The aliquots are esterified with diazomethane and analyzed by gas liquid chromatography to determine whether hydrogenation has been completed. When the hydrogenation is determined to be essentially complete (ca. six hours) the reaction mixture is applied to 20% wt. silver nitrate impregnated silica gel (G) preparative plates developing with chloroform:methanol:acetic acid:water in a 95:75:1:0.6 parts by volume ratio. The zone corresponding to the 9-keto-10β,11β-methylene-15α-hydroxyprost-13-trans-enoic acid is eluted with a 90:10, by vol., ratio mixture of chloroform and methanol yielding pure 9-keto-10β,11β-methylene-15α-hydroxyprost-13-trans-enoic acid.

Similarly, 9-keto-11-methyl-15α-hydroxyprosta-10,13-trans-dienoic acid is prepared by following the same procedure but using 9-keto-11-methyl-15α-hydroxyprosta-5-cis,10,13-trans-trienoic acid as the starting material.

EXAMPLE 8

A mixture of 100 mg. of 9-keto-10β,11β-methylene-15α-hydroxyprosta-5-cis,13-trans-dienoic acid, 0.4 ml. of pyridine and 0.8 ml. of propionic anhydride is kept at room temperature for one hour. The reaction mixture is then evaporated to dryness under reduced pressure and the residue is dissolved in ethyl acetate. Then 50 mg. of sodium bisulfate are added and the solution is filtered through diatomaceous earth. The filtrate is evaporated to dryness to yield 9-keto-10β,11β-methylene-15α-propioxyprosta-5-cis,13-trans-dienoic acid.

By the same process but using caproic, enanthic and cyclopentylpropionic anhydrides as esterifying agents, there are respectively obtained the C-15α caproate, enanthate and cyclopentylpropionate of 9-keto-10β,11β-methylene-15α-hydroxyprosta-5-cis,13-trans-dienoic acid.

In a similar manner, 9-keto-10β,11β-methylene-15α-hydroxyprost-13-trans-enoic acid; 9-keto-11-methyl-15α-hydroxyprosta-5-cis,10,13-trans-trienoic acid; and 9-keto-11-methyl-15α-hydroxyprosta-10,13-trans-dienoic acid are respectively converted into the corresponding C-15α propionate, caproate, enanthate and cyclopentylpropionate.

EXAMPLE 9

To a solution of 100 mg. of 9-keto-10β,11β-methylene-15α-hydroxyprosta-5-cis,13-trans-dienoic acid in 10 ml. of methanol is added 3 ml. of an 0.1N solution of sodium hydroxide, and the mixture is stirred at room temperature for one hour. It is then evaporated to dryness under reduced pressure, to give the sodium salt of 9-keto-10β,11β-methylene-15α-hydroxyprosta-5-cis,13-trans-dienoic acid.

By employing 1.1 molar equivalents of potassium hydroxide (in the form of an 0.1N solution) in place of sodium hydroxide in the above procedure the potassium salt is obtained.

Similarly by following the same procedure, the sodium and potassium salts of 9-keto-10β,11β-methylene-15α-hydroxyprost-13-trans-enoic acid; 9-keto-11-methyl-15α-hydroxyprosta-5-cis,10,13-trans-trienoic acid; and 9-keto-11-methyl-15α-hydroxyprosta-10,13-trans-dienoic acid are respectively prepared.

EXAMPLE 10

To a solution of 100 mg. of 9-keto-10β,11β-methylene-15α-hydroxyprosta-5-cis,13-trans-dienoic acid in 10 ml. of methanol is added a mixture of 3 ml. of concentrated ammonium hydroxide solution and 5 ml. of methanol. The resulting mixture is stirred for two hours at room temperature and then evaporated to dryness to yield the ammonium salt of 9-keto-10β,11β-methylene-15α-hydroxyprosta-5-cis,13-trans-dienoic acid.

By employing dimethylamine, diethylamine or dipropylamine in place of ammonium hydroxide in the above process, the corresponding salts of 9-keto-10β,11β-methylene-15α-hydroxyprosta-5-cis,13-trans-dienoic acid are obtained.

In a similar manner, the ammonium, dimethylamine, diethylamine and dipropylamine salts of 9-keto-10β,11β-methylene-15α-hydroxyprosta-13-trans-enoic acid; 9-keto-11-methyl-15α-hydroxyprosta-5-cis,10,13-trans-trienoic acid; and 9-keto-11-methyl-15α-hydroxyprosta-10,13-trans-enoic acid are respectively obtained.

EXAMPLE 11

Two hundred milligrams of 9-keto-10β,11β-methylene-15α-hydroxyprosta-5-cis,13-trans-dienoic acid are dissolved in 10 ml. of a saturated solution of diazoethane in ether, and the reaction mixture is maintained at room temperature for 2 hours. It is then evaporated to dryness under reduced pressure, thus obtaining 9-keto-10β,11β-methylene-15α-hydroxyprosta-5-cis,13-trans-dienoic acid ethyl ester.

In a similar manner but using diazopropane instead of diazoethane, there is obtained 9-keto-10β,11β-methylene-15α-hydroxyprosta-5-cis,13-trans-dienoic acid propyl ester.

Likewise, the ethyl and propyl esters of 9-keto-10β,11β-methylene-15α-propionoxyprosta-5-cis,13-trans-dienoic acid; 9-keto-10β,11β-methylene-15α- hydroxyprost-13-trans-enoic acid; 9-keto-11-methyl-15α-hydroxyprosta-5-cis,10,13-trans-trienoic acid; and 9-keto-11-methyl-15α-hydroxyprosta-10,13-trans-dienoic acid are respectively prepared.

Obviously many modifications of the invention, described herein above and below and in the claims, can be made without departing from the essence and scope thereof.

What is claimed is:

1. A compound selected from the group of those represented by the formula:

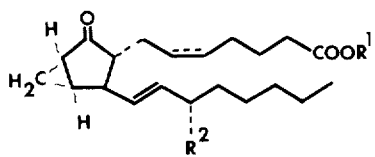

wherein $R^1$ is hydrogen or lower alkyl; $R^2$ is selected from the group consisting of hydroxy, methoxy, ethoxy, cyclopentoxy, tetrahydrofuran-2-yloxy, tetrahydropyran-2-yloxy, 4-methoxytetrahydropyran-4-yloxy, a hydrocarbon carboxylic acyloxy group containing from 1 to 12 carbon atoms or a substituted hydrocarbon carboxylic acyloxy having from 1 to 12 carbon atoms wherein the substituent is selected from the group consisting of hydroxy, alkoxy containing up to six carbon atoms, hydrocarbon carboxylic acyloxy containing up to twelve carbon atoms, nitro, amino and halogen; the dotted bond line between the C-5 and C-6 position indicates that the bond joining the C-5 and C-6 position is a saturated ethylene bond or a cis-olefin double bond; and the pharmaceutically acceptable salts of the above compounds wherein $R^1$ is hydrogen.

2. The compound of claim 1 wherein the bond joining C-5 and C-6 carbon atoms is a saturated bond and pharmaceutically acceptable salts thereof.

3. The compound of claim 2 wherein said compound is 9-keto-10β,11β-methylene-15α-hydroxyprost-13-trans-enoic acid and pharmaceutically acceptable salts thereof.

4. The compound of claim 1 wherein the bond joining the C-5 and C-6 carbon atoms is a cis-olefin double bond, and pharmaceutically acceptable salts thereof.

5. The compound of claim 4 wherein said compound is 9-keto-10β,11β-methylene-15α-hydroxyprosta-5-cis,13-transdienoic acid, and pharmaceutically acceptable salts thereof.

* * * * *